(12) United States Patent
Agarwal et al.

(10) Patent No.: US 11,100,813 B2
(45) Date of Patent: Aug. 24, 2021

(54) SYSTEM AND METHOD FOR MANAGING SCREEN READER ANNOUNCEMENTS ON WEB PAGES

(71) Applicant: salesforce.com, inc., San Francisco, CA (US)

(72) Inventors: Nishant Agarwal, San Francisco, CA (US); William Chang, Sunnyvale, CA (US); Cordelia McGee-Tubb, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 272 days.

(21) Appl. No.: 16/407,785

(22) Filed: May 9, 2019

(65) Prior Publication Data

US 2020/0357304 A1    Nov. 12, 2020

(51) Int. Cl.
*G06F 9/54*    (2006.01)
*G09B 21/00*   (2006.01)
*H04L 12/58*   (2006.01)

(52) U.S. Cl.
CPC ........... *G09B 21/007* (2013.01); *G06F 9/542* (2013.01); *G09B 21/005* (2013.01); *H04L 51/046* (2013.01)

(58) Field of Classification Search
CPC ......... G06F 9/4443; G06F 9/542; G06F 9/546
USPC .................................. 719/313, 314, 318, 329
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |

(Continued)

*Primary Examiner* — Andy Ho
(74) *Attorney, Agent, or Firm* — LKGlobal | Lorenz & Kopf, LLP

(57) ABSTRACT

A system for managing content sent to a screen reader is provided. The system is configured to monitor the context of a window, wherein the window context is minimized or active; and when the window context is minimized: monitor for a received textual message in a dynamic area of the window; generate, for each consecutive time interval of a pre-determined fixed time period, an announcement, for each textual message context, indicating that a textual message of a particular context has been detected responsive to the first textual message of the particular context being detected during the time interval and not for any subsequent textual message of the particular context detected during the time interval; and send one announcement for each textual message context per time interval to the screen reader if at least one textual message for a particular context was received during the time interval.

20 Claims, 3 Drawing Sheets

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 7,908,557 B2 * | 3/2011 | Schrepp .............. G06F 9/451 715/729 |
| 8,014,943 B2 | 9/2011 | Jakobson |
| 8,015,495 B2 | 9/2011 | Achacoso et al. |
| 8,032,297 B2 | 10/2011 | Jakobson |
| 8,037,212 B2 * | 10/2011 | Taylor .................. H04L 51/16 710/22 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,874,990 B2 * | 1/2018 | Khalatian ............. G06F 3/0481 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0197124 A1 * | 8/2011 | Garaventa ............ G06F 16/972 715/234 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

* cited by examiner

SYSTEM AND METHOD FOR MANAGING SCREEN READER ANNOUNCEMENTS ON WEB PAGES

TECHNICAL FIELD

Embodiments of the subject matter described herein relate generally to screen reader technology, and more particularly to screen reader activation technology.

BACKGROUND

Parts of a web page may be dynamically changed without the entire page reloading—for instance, to display a newly received message in a chat session. While the changes may be visually apparent to users who can see the page, the changes may not be obvious to users of assistive technologies. Users with disabilities may navigate and interact with webpages using an assistive technology called a screen reader, which reads out information about the page in braille or audio format. An ARIA live region is a mechanism for notifying screen readers when content is updated on a page. When an update takes place within an ARIA live region, a screen reader is automatically notified (wherever its focus is at the time), to allow the screen reader to convey an announcement that updated content is available to the user.

When a window used to display a web page that provides a chat session is minimized and the messages that are received are posted within an ARIA live region, each received message could lead to a screen reader conveying an announcement to the user that a new message has been received. If multiple messages are received within a short time period, the screen reader could convey multiple announcements, which could become distractive and annoying to the user whose focus may be elsewhere particularly when the chat window has been minimized.

Hence, it is desirable to provide a system and method for notifying screen readers when content is updated on a page without causing the screen reader to convey too many announcements. Furthermore, other desirable features and characteristics of the present disclosure will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
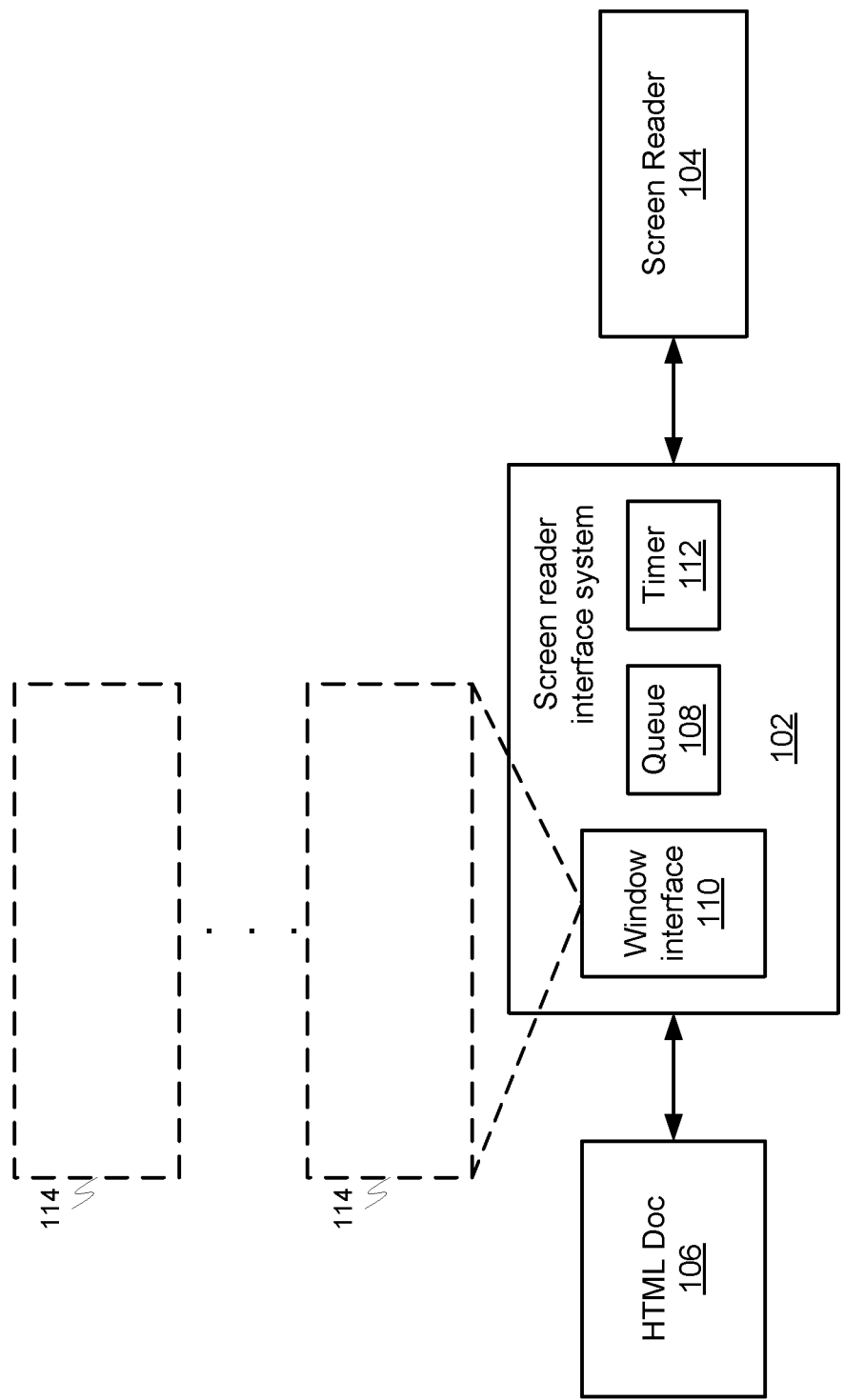
FIG. 1 is a block diagram depicting an example screen reader interface system for managing dynamic content from a web page window that is to be sent to a screen reader, in accordance with some embodiments.

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

The subject matter described herein discloses apparatus, systems, techniques and articles for creating a more user-friendly chat experience for users of assistive technologies such as screen readers by providing features that enhance the capabilities of announcements made by various screen readers. The apparatus, systems, techniques and articles described herein provide a way to reduce the disparity between the chat experience observed by users who navigate with and without assistive technology.

While a chat session is in progress, users may multi-task by minimizing the current chat window to explore other parts of the web page. While the chat window is minimized, announcing the content or count of incoming unread messages each time a message is received especially during a group conference might be too overwhelming for the user and may disrupt a user's natural flow in browsing other important facts on a web page. The apparatus, systems, techniques and articles described herein can restrict the quantity of announcements on the basis of context, time or number.

The apparatus, systems, techniques and articles described herein can provide for a screen reader to convey all pending, unannounced messages to the user when the user returns to a chat session (e.g., the chat window is active) so that a user may not miss useful information passed during the chat conversation. The apparatus, systems, techniques and articles described herein provide a Single Aria Live Region that can restrict the quantity of announcements on the basis of time or number while a chat window is minimized and that can provide for a screen reader to convey all pending, unannounced messages to the user when the chat window becomes active.

The apparatus, systems, techniques and articles described herein can provide a dedicated aria-live region that handles all the live accessible announcements that can be accessed from internal code components that need to push out messages to screen readers. The apparatus, systems, techniques and articles described herein can provide a single aria-live component that is initialized when a chat session is initiated and wherein all resources used by the single aria-live component is reclaimed when the chat session is terminated. The apparatus, systems, techniques and articles described herein can provide an API that accepts various configurable parameters for determining how announcements are to be handled for each single aria-live component.

FIG. 1 is a block diagram depicting an example screen reader interface system 102 for managing dynamic content from a web page window that is to be sent to a screen reader 104 for output by the screen reader 104, e.g., via voice or braille. The example system 102 comprises one or more processor(s) that are configured by programming instructions encoded in non-transient computer readable media, non-transient computer readable media, and storage elements such as memory devices and disc drives. The system 102 is configured to function as an interface between a window (e.g., generated by a HTML document 106) and a screen reader 104. The window is configured for display on a display device, such as a computer monitor, and has a window area in which dynamic content, such as a textual message from a chat session, may be inserted. The example screen reader 104 is implemented by one or more processor(s) executing computer readable programming instructions that causes the screen reader 104 to convert text that is displayed in the dynamic content window area (e.g., from HLML document 106) into a form that a visually impaired user can process (e.g., tactile, auditory or a combination of both).

The example screen reader interface system 102 is configured to manage what textual content gets sent to the screen reader 104 and when the textual content gets sent to the screen reader 104. When a window is minimized, the example system 102 is configured to save in a queue 108 (e.g., a memory queue) textual content (e.g., messages) received for display in the dynamic content window area and to send a textual announcement to the screen reader 104 at a pre-determined time interval that announces that textual content has been received in the dynamic content window area of the minimized window during the time interval. As an example, if two messages were received during the time interval, the textual announcement may comprise a message stating that two new messages have been received. When a window is made active or maximized, the example system 102 is configured to send to the screen reader 104 both the textual content saved in the queue 108 and textual content received in the dynamic content window area while the window is active. The example system 102 is configured to first send the textual content saved in the queue 108 followed by any new incoming messages.

The processor(s) configured by programming instructions, non-transient computer readable media, and storage elements in the example screen reader interface system 102 collectively implement the queue 108, a window interface module 110, and a timer 112. The queue 108 is used to store received textual content in the order received while the window is minimized. The timer 112 is used to mark the boundaries of predetermined fixed time duration intervals while the window is minimized. The timer 112 begins counting to mark the boundaries of the predetermined fixed time duration intervals when the context of a window switches to a minimized state and repeats the counting when the predetermined fixed time duration is reached.

The window interface module 110 is configured to monitor the context of a window on a user display device, wherein the window context indicates whether the window is minimized or active. The window interface module 110 is also configured to monitor for and retrieve received textual content in a dynamic area of the window.

The example screen reader interface system 102 is configured to throttle the number of message announcements read out by a screen reader 104 when new textual content is received. In one embodiment, the example screen reader interface system 102 is configured to cause message announcements to be read out by a screen reader 104 only after a certain time interval has elapsed. For example, if a time between intervals configuration parameter of is set to 60 seconds, then the reception of multiple messages from the same context/function within a 60 second time period will result in only one message announcement being passed to a screen reader for conveyance to a user, while notifications made from different functions may still be conveyed to the user by the screen reader 104. This can help curb the number of redundant announcements made by the screen reader to enhance the experience of the user of the screen reader 104.

In this example, the same context/function refers to chat messages from the same source that are to be displayed in the same chat window. For example, in the case of a multi-party chat session, the example screen reader interface system 102 may be configured, e.g., via configurable parameters, to generate a message announcement during a time interval each time a first message is received from a different participant in the multi-party chat session. Therefore if within the 60 second time interval, two messages were received from a first participant, three messages were received from a second participant, and one message was received from a third participant, the example screen reader interface system 102 would cause one message announcement to be conveyed corresponding to the first participant, one message announcement to be conveyed corresponding to the second participant, and one message announcement to be conveyed corresponding to the third participant. In this example, a message from a particular participant would be considered as having a different context as a message from a different participant. In other examples, the example screen reader interface system 102 could be configured (e.g., by configurable parameters) to cause only one total message announcement to be conveyed for all six messages because the system 102 could be configured (e.g., by configurable parameters) to treat the messages from the different participants as having the same context.

In addition to chat messages, textual messages may include system messages such as "Agent disconnected" or "File transfer cancelled" or a timeout message. System messages would be considered as having a different message context as a chat message. Different types of system messages could also have the same or different message context as other system messages.

When the window context is minimized, the window interface module 110 is further configured to generate, for each consecutive time interval of a pre-determined fixed time period (e.g., as determined by the timer 112), an announcement, for each textual message context. The generated announcement is configured to indicate that a textual message of a particular context has been detected. The announcement would only be generated when the first textual message of the particular context was detected during the time interval. A separate announcement would not be generated for any subsequent textual message of the particular context being detected during the time interval. The window interface module 110 is further configured to send the one announcement generated for each textual message context per time interval to the screen reader for output by the screen reader when at least one textual message for a particular context was received during the time interval. The one announcement that is sent for each textual message context per time interval may be sent at the end of a time interval. An announcement for textual message(s) received in a subsequent time intervals may be sent after the pre-determined fixed time period has elapsed from the sending of the prior announcement. A textual message context may be determined based on the originator of the message wherein a message from one participant may have one message context and a message from a different participant may have a different message context. Sending one announcement for each textual message context per time interval may involve sending one announcement for a message from one participant and one announcement for a message from a different participant. When the window context is minimized, the system is further configured to store each detected textual message in a queue 108 in the order in which the textual message was detected.

When the window context is active, the example screen reader interface system 102 is further configured to send each textual message stored in the queue 108 to the screen reader 104 for output by the screen reader in the order in which the textual message was stored.

The example screen reader interface system 102 further includes a plurality of interfaces 114 (e.g., aria-live regions) provided by the window interface 110 for interfacing with an HTML document that generates a window wherein the system 102 is configured to automatically connect the HTML document to an appropriate interface 114. At times when multiple messages are sent in a short space of time, screen readers often find it hard to keep pace with the message inflow and tend to skip certain messages leading to loss of information for the users. To overcome this issue the example screen reader interface system 102 uses multiple interfaces 114 (e.g., aria-live regions) for hosting the messages and implements a framework which automatically routes the message to the interface 114 (e.g., aria-live region) that is not in use. This eradicates the problem of data loss and ensures that all the messages are consistently read out to the users.

Figure 2:
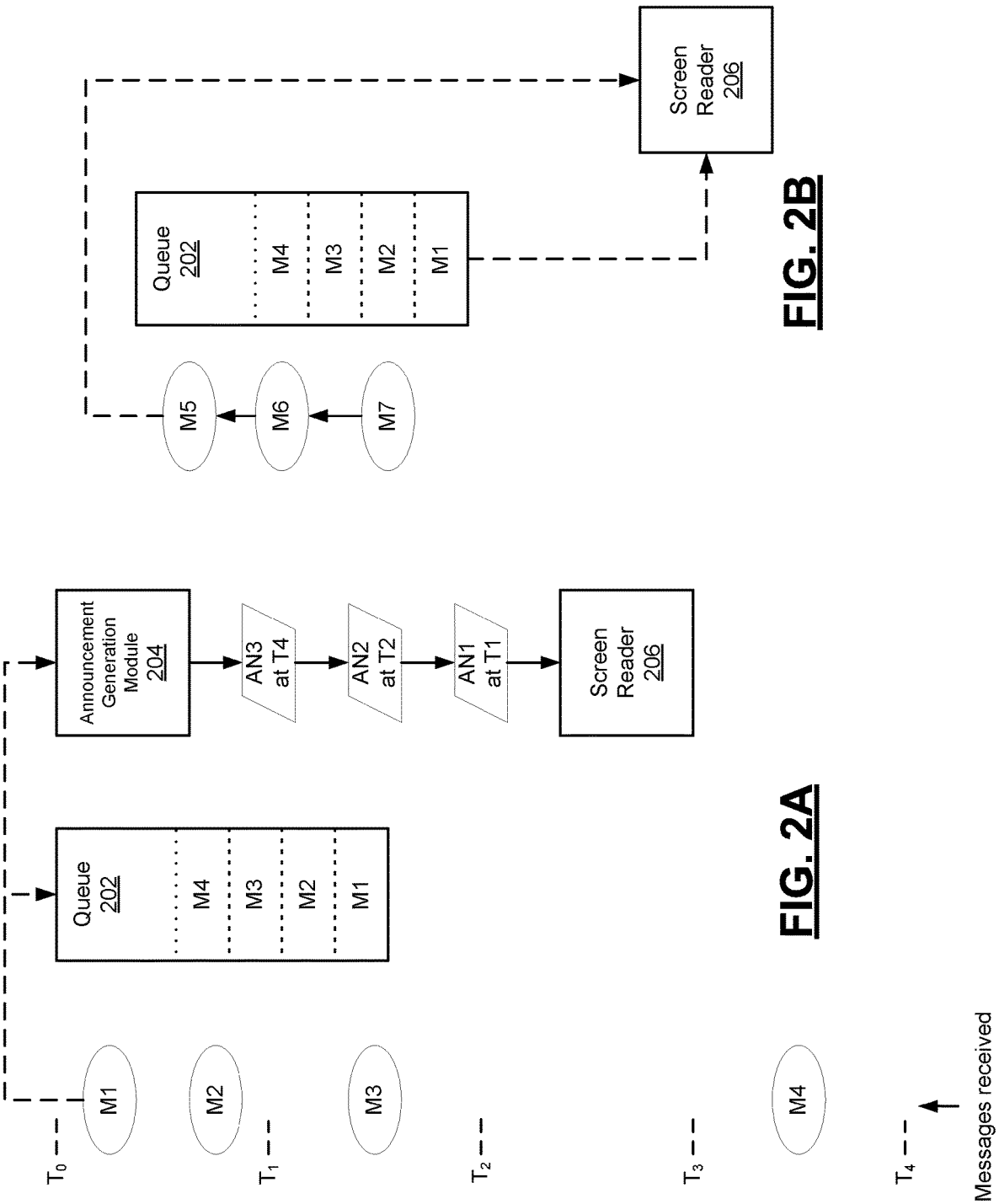
FIG. 2A is a block diagram illustrating an example operating scenario within the example screen reader interface system when a monitored window is minimized, in accordance with some embodiments.
FIG. 2B is a block diagram illustrating an example operating scenario within the example screen reader interface system when a monitored window becomes active after being minimized, in accordance with some embodiments.

FIG. 2A is a block diagram illustrating an example operating scenario within the example screen reader interface system 102 when a monitored window is minimized. When a window is minimized, time periods ($T_0$, $T_1$, $T_2$, $T_3$ $T_4$) of a predetermined, fixed time duration are determined, for example, using a timer. As messages (M1, M2, M3, M4) are received, the messages are mapped to one of the time periods ($T_0$, $T_1$, $T_2$, $T_3$ $T_4$) and stored in a Queue 202 in the order received. An indication that a message has been received during one of the time periods results in the generation (e.g., by an announcement generation module 204) of an announcement message (AN1, AN2, AN3) that is sent to the screen reader 206. In this example, two messages from different contexts are received between $T_0$ and $T_1$, but only one announcement message (AN1) is generated at $T_1$. One announcement message (AN2) is generated at $T_2$ because a message (M3) was received between $T_1$ and $T_2$. No announcement message is generated at $T_3$ because no message was received between $T_2$ and $T_3$. One announcement message (AN3) is generated at $T_4$ because a message (M4) was received between $T_3$ and $T_4$.

FIG. 2B is a block diagram illustrating an example operating scenario within the example screen reader interface system 102 when a monitored window becomes active after being minimized. When the window becomes active, the messages (M1, M2, M3, M4) stored in the Queue 202 are sent to the screen reader 206 for output. Also, messages (M5, M6, M7) received while the window is active are also sent to the screen reader 206 for output. In this example, the messages (M5, M6, M7) are sent to the screen reader 206 after the messages (M1, M2, M3, M4) stored in the Queue 202 are sent to the screen reader 206 for output.

Figure 3:
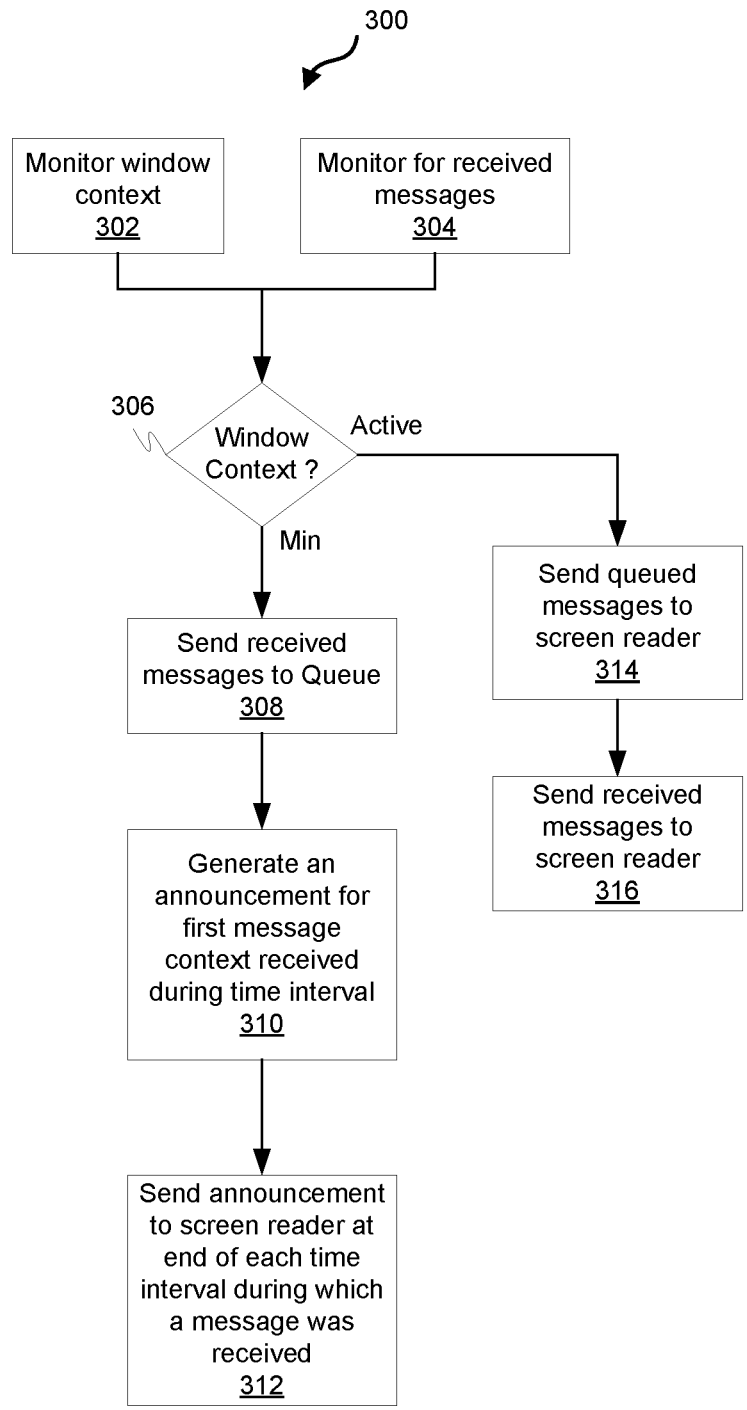
FIG. 3 is a process flow chart depicting an example process for managing content sent to a screen reader in an example screen reader interface system, in accordance with some embodiments.

FIG. 3 is a process flow chart depicting an example process 300 for managing content sent to a screen reader in an example screen reader interface system. The order of operation within the example process 300 is not limited to the sequential execution as illustrated in the figure, but may be performed in one or more varying orders as applicable and in accordance with the present disclosure.

The example process includes monitoring the context of a window on a user display device, the window context being minimized or active (operation 302), and monitoring for received textual messages in a dynamic area of the window (operation 304). The method further includes deciding whether the window context is minimized or active (decision 306).

When the window context is minimized, the example process includes (a) storing each detected textual message in a queue in the order in which the textual message was detected (operation 308); (b) generating, for each consecutive time interval of a pre-determined fixed time period, an announcement, for each textual message context, indicating that a textual message of a particular context has been detected responsive to the first textual message of the particular context being detected during the time interval and not for any subsequent textual message of the particular context being detected during the time interval (operation 310); and (c) sending one announcement for each textual message context per time interval to the screen reader for output by the screen reader if at least one textual message for a particular context was received during the time interval (operation 312).

The one announcement that is sent for each textual message context per time interval, the may be sent at the end of a time interval. An announcement for textual message(s) received in a subsequent time interval may be sent after the pre-determined fixed time period has elapsed from the sending of the prior announcement. A textual message from a first chat participant may have a different textual message context than a textual message from a second chat participant and the sending one announcement for each textual message context per time interval may include sending one announcement for a new message having a first message context and one announcement for a new message having a second message context to the screen reader during the same time interval.

When the window context is active, the example process includes sending each textual message stored in the queue to the screen reader for output by the screen reader in the order in which the textual message was stored (operation 314); and sending each textual message received while the window context is active to the screen reader (operation 316).

The apparatus, systems, techniques, methods and articles described herein are implemented by a controller and/or computer system. The controller/computer system includes at least one processor and a computer-readable storage device or media encoded with computer readable programming instructions for configuring the controller/computer system. The methods and techniques described herein can be captured in computer readable programming instructions for execution by the at least one processor to cause the example controller/computer system to perform the described methods, processes, and techniques. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller/ computer system, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller/computer system.

The controller/computer system may also include output device(s) that present information to the user of the controller/computer system and can include things such as a braille display, monitor, speakers, or the like.

In one embodiment, a system for managing content sent to a screen reader is provided. The system comprises a processor configured by programming instructions encoded on non-transient computer readable media. The system is configured to monitor the context of a window on a user display device, wherein the window context is minimized or active; and when the window context is minimized: monitor for a received textual message in a dynamic area of the window; generate, for each consecutive time interval of a pre-determined fixed time period, an announcement, for each textual message context, indicating that a textual message of a particular context has been detected responsive to the first textual message of the particular context being detected during the time interval and not for any subsequent textual message of the particular context being detected during the time interval; and send one announcement for each textual message context per time interval to the screen reader for output by the screen reader if at least one textual message for a particular context was received during the time interval.

These aspects and other embodiments may include one or more of the following features. To send one announcement for each textual message context per time interval, the system may be configured to send one announcement for each textual message context per time interval at the end of a time interval. To send one announcement for each textual message context per time interval, the system may be configured to send a subsequent announcement after the pre-determined fixed time period has elapsed from the sending of the prior announcement. A textual message from a first chat participant may have a different textual message context than a textual message from a second chat participant. A textual message from a first chat participant is a textual message from a first context and a textual message from a second chat participant may be a textual message from a different context. To send one announcement for each textual message context per time interval, the system may be configured to send one announcement for a new message having a first message context and one announcement for a new message having a second message context to the screen reader during the same time interval. When the window context is minimized, the system may be further configured to store each detected textual message in a queue in the order in which the textual message was detected. When the window context is active, the system may be further configured to send each textual message stored in the queue to the screen reader for output by the screen reader in the order in which the textual message was stored. The system may further comprise providing a plurality of interfaces for interfacing with an HTML document that generates a window wherein the system is configured to automatically connect the HTML document to an appropriate interface.

In another embodiment, a computer-implemented method for managing content sent to a screen reader is provided. The method comprises monitoring the context of a window on a user display device, the window context being minimized or active; and when the window context is minimized: monitoring for a received textual message in a dynamic area of the window; generating, for each consecutive time interval of a pre-determined fixed time period, an announcement, for each textual message context, indicating that a textual message of a particular context has been detected responsive to the first textual message of the particular context being detected during the time interval and not for any subsequent textual message of the particular context being detected during the time interval; and sending one announcement for each textual message context per time interval to the screen reader for output by the screen reader if at least one textual message for a particular context was received during the time interval.

These aspects and other embodiments may include one or more of the following features. The sending one announcement for each textual message context per time interval may comprise sending one announcement for each textual message context per time interval at the end of a time interval. The sending one announcement for each textual message context per time interval may comprise sending a subsequent announcement after a duration of time equal to the pre-determined fixed time period has elapsed from the sending of the prior announcement. A textual message from a first chat participant may have a different textual message context than a textual message from a second chat participant. The method may further comprise, when the window context is minimized, storing each detected textual message in a queue in the order in which the textual message was detected. The method may further comprise, when the window context is active, sending each textual message stored in the queue to the screen reader for output by the screen reader in the order in which the textual message was stored.

In another embodiment, non-transient computer readable media encoded with computer programming instructions configurable to cause a processor to perform a method is provided. The method comprises: monitoring the context of a window on a user display device, the window context being minimized or active; and when the window context is minimized: monitoring for a received textual message in a dynamic area of the window; generating, for each consecutive time interval of a pre-determined fixed time period, an announcement, for each textual message context, indicating that a textual message of a particular context has been detected responsive to the first textual message of the particular context being detected during the time interval and not for any subsequent textual message of the particular context being detected during the time interval; and sending one announcement for each textual message context per time interval to the screen reader for output by the screen reader if at least one textual message for a particular context was received during the time interval.

These aspects and other embodiments may include one or more of the following features. The sending one announcement for each textual message context per time interval may comprise sending one announcement for each textual message context per time interval at the end of a time interval. The sending one announcement for each textual message context per time interval may comprise sending a subsequent announcement after the pre-determined fixed time period has elapsed from the sending of the prior announcement. A textual message from a first chat participant may have a different textual message context than a textual message from a second chat participant. The method may further comprise, when the window context is minimized, storing each detected textual message in a queue in the order in which the textual message was detected. The method may further comprise, when the window context is active, sending each textual message stored in the queue to the screen reader for output by the screen reader in the order in which the textual message was stored.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" or "example" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to web pages, screen readers, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A system for managing content sent to a screen reader, the system comprising a processor configured by programming instructions encoded on non-transitory computer readable media, the system configured to:
   monitor the context of a window on a user display device, the window context being minimized or active; and
   when the window context is minimized:
      monitor for a received textual message in a dynamic area of the window;
      generate, for each consecutive time interval of a pre-determined fixed time period, an announcement, for each textual message context, indicating that a textual message of a particular context has been detected responsive to a first textual message of the particular context being detected during the time interval and not for any subsequent textual message of the particular context being detected during the time interval; and
      send one announcement for each textual message context per time interval to the screen reader for output by the screen reader if at least one textual message for a particular context was received during the time interval.

2. The system of claim 1, wherein to send one announcement for each textual message context per time interval, the system is configured to send one announcement for each textual message context per time interval at the end of a time interval.

3. The system of claim 1, wherein to send one announcement for each textual message context per time interval, the system is configured to send a subsequent announcement after the pre-determined fixed time period has elapsed from the sending of the prior announcement.

4. The system of claim 1, wherein a textual message from a first chat participant is a textual message from a first context and a textual message from a second chat participant is a textual message from a different context.

5. The system of claim 1, wherein to send one announcement for each textual message context per time interval, the system is configured to send one announcement for a new message having a first message context and one announcement for a new message having a second message context to the screen reader during the same time interval.

6. The system of claim 1, wherein, when the window context is minimized, the system is further configured to store each detected textual message in a queue in the order in which the textual message was detected.

7. The system of claim 6, wherein, when the window context is active, the system is further configured to send each textual message stored in the queue to the screen reader for output by the screen reader in the order in which the textual message was stored.

8. The system of claim 7, wherein the system is further configure to provide a plurality of interfaces for interfacing with an HTML document that generates a window wherein the system is configured to automatically connect the HTML document to an appropriate interface.

9. A computer-implemented method for managing content sent to a screen reader, the method comprising:
monitoring the context of a window on a user display device, the window context being minimized or active; and
when the window context is minimized:
monitoring for a received textual message in a dynamic area of the window;
generating, for each consecutive time interval of a pre-determined fixed time period, an announcement, for each textual message context, indicating that a textual message of a particular context has been detected responsive to a first textual message of the particular context being detected during the time interval and not for any subsequent textual message of the particular context being detected during the time interval; and
sending one announcement for each textual message context per time interval to the screen reader for output by the screen reader if at least one textual message for a particular context was received during the time interval.

10. The method of claim 9, wherein the sending one announcement for each textual message context per time interval comprises sending one announcement for each textual message context per time interval at the end of a time interval.

11. The method of claim 9, wherein the sending one announcement for each textual message context per time interval comprises sending a subsequent announcement after a duration of time equal to the pre-determined fixed time period has elapsed from the sending of the prior announcement.

12. The method of claim 9, wherein a textual message from a first chat participant has a different textual message context than a textual message from a second chat participant.

13. The method of claim 9, further comprising, when the window context is minimized, storing each detected textual message in a queue in the order in which the textual message was detected.

14. The method of claim 13, further comprising, when the window context is active, sending each textual message stored in the queue to the screen reader for output by the screen reader in the order in which the textual message was stored.

15. Non-transitory computer readable media encoded with computer programming instructions configurable to cause a processor to perform a method, the method comprising:
monitoring the context of a window on a user display device, the window context being minimized or active; and
when the window context is minimized:
monitoring for a received textual message in a dynamic area of the window;
generating, for each consecutive time interval of a pre-determined fixed time period, an announcement, for each textual message context, indicating that a textual message of a particular context has been detected responsive to a first textual message of the particular context being detected during the time interval and not for any subsequent textual message of the particular context being detected during the time interval; and
sending one announcement for each textual message context per time interval to the screen reader for output by the screen reader if at least one textual message for a particular context was received during the time interval.

16. The non-transitory computer readable media of claim 15, wherein the sending one announcement for each textual message context per time interval comprises sending one announcement for each textual message context per time interval at the end of a time interval.

17. The non-transitory computer readable media of claim 15, wherein the sending one announcement for each textual message context per time interval comprises sending a subsequent announcement after the pre-determined fixed time period has elapsed from the sending of the prior announcement.

18. The non-transitory computer readable media of claim 15, wherein a textual message from a first chat participant has a different textual message context than a textual message from a second chat participant.

19. The non-transitory computer readable media of claim 15, wherein the method further comprises, when the window context is minimized, storing each detected textual message in a queue in the order in which the textual message was detected.

20. The non-transitory computer readable media of claim 19, wherein the method further comprises, when the window context is active, sending each textual message stored in the queue to the screen reader for output by the screen reader in the order in which the textual message was stored.

* * * * *